(12) United States Patent
Jeong et al.

(10) Patent No.: US 8,638,851 B2
(45) Date of Patent: Jan. 28, 2014

(54) JOINT BANDWIDTH DETECTION ALGORITHM FOR REAL-TIME COMMUNICATION

(75) Inventors: Hyeonkuk Jeong, Saratoga, CA (US); Xiaosong Zhou, Campbell, CA (US); Joe Abuan, San Jose, CA (US); Xiaojin Shi, Fremont, CA (US); Hsi-Jung Wu, San Jose, CA (US); James Oliver Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 725 days.

(21) Appl. No.: 12/646,065

(22) Filed: Dec. 23, 2009

(65) Prior Publication Data

US 2011/0149087 A1   Jun. 23, 2011

(51) Int. Cl.
*H04N 7/12*   (2006.01)

(52) U.S. Cl.
USPC ........ 375/240.1; 375/140; 375/240; 375/377; 370/232; 370/235; 370/468; 704/500; 714/716; 714/717; 725/135

(58) Field of Classification Search
USPC .......................... 348/423–470; 370/232–468; 375/140–377; 704/500; 714/716–717; 725/135
See application file for complete search history.

(56) References Cited

U.S. PATENT DOCUMENTS

| | | | |
|---|---|---|---|
| 5,898,696 A * | 4/1999 | Proctor et al. | 370/468 |
| 6,310,857 B1 * | 10/2001 | Duffield et al. | 370/232 |
| 6,745,364 B2 | 6/2004 | Bhatt et al. | |
| 7,395,211 B2 | 7/2008 | Watson et al. | |
| 7,502,975 B2 * | 3/2009 | Nagai et al. | 714/717 |
| 2005/0002337 A1 | 1/2005 | Wang et al. | |
| 2007/0074266 A1 | 3/2007 | Raveendran et al. | |

* cited by examiner

*Primary Examiner* — William C Vaughn, Jr.
*Assistant Examiner* — Luis M Perez
(74) *Attorney, Agent, or Firm* — Meyertons, Hood, Kivlin, Kowert & Goetzel, PC

(57) ABSTRACT

A video coding system and method for increasing a transmitted output bit rate of a video encoding system by altering the content of the bit stream. A video encoder may receive a coding mode signal from a computer application for coding source video data, the coding mode signal indicating a target bit rate having a risk factor related to transmission error associated to the target bit rate. The coded bitstream may be modified based on the risk factor indicated in the coding mode signal. A modified coded bitstream may be outputted at the target bit rate and at a reduced coding efficiency, and the channel may be tested for transmission errors. Based on the test results, a revised coding mode signal indicating the same target bit rate, but a revised risk factor may be provided. The coded bitstream may be revised by removing the modifications previously made to the coded bitstream and a revised coded bitstream having greater coding efficiency may be output at the target bit rate.

27 Claims, 8 Drawing Sheets

200

300

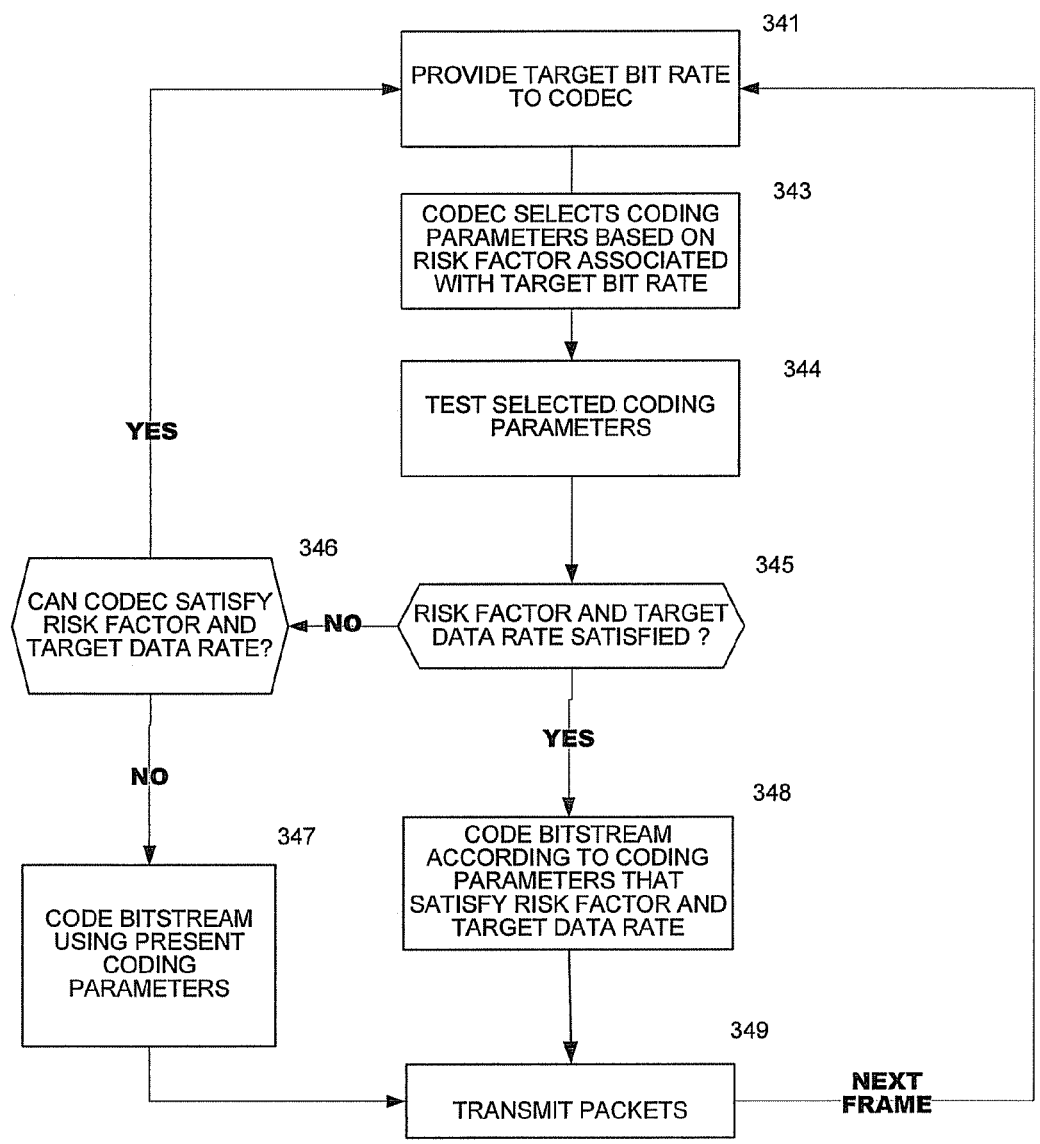

400

500

600

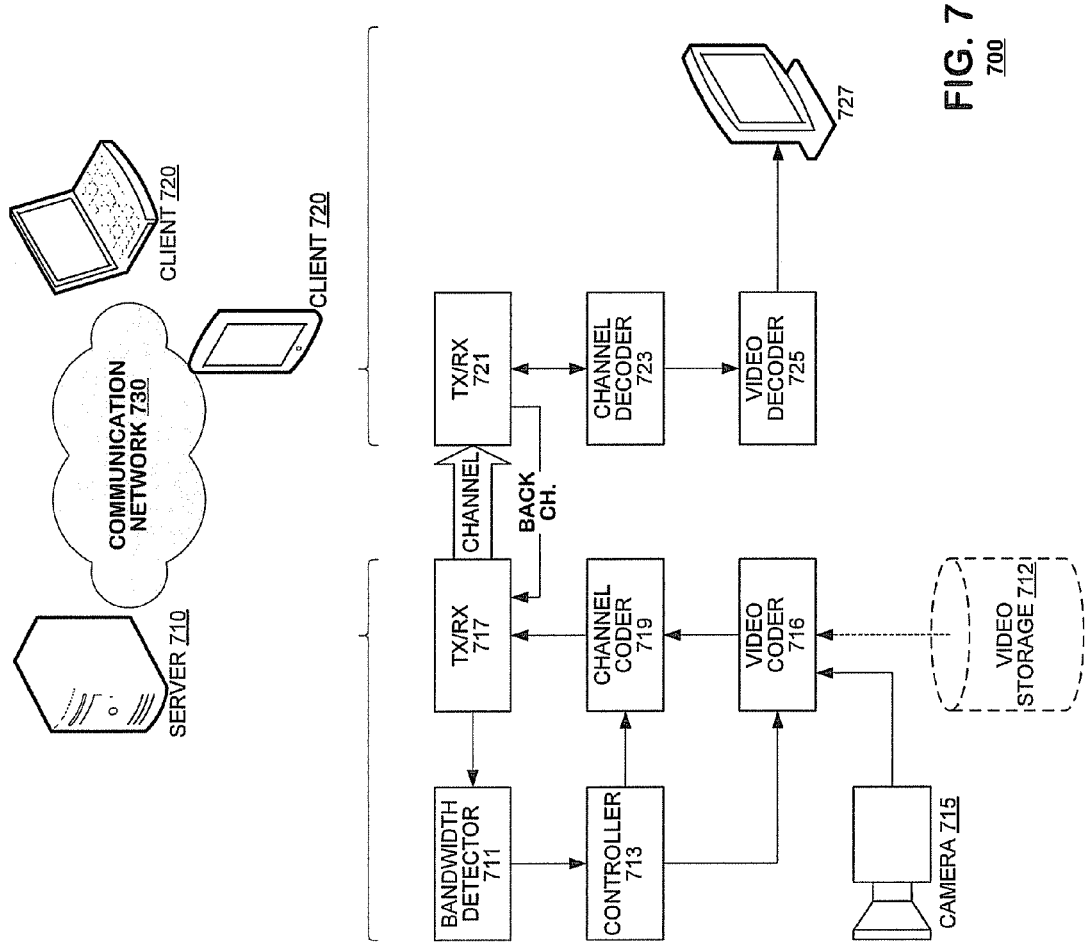

JOINT BANDWIDTH DETECTION ALGORITHM FOR REAL-TIME COMMUNICATION

BACKGROUND

The present invention relates to video coding for communication environments in which channel bandwidth may vary dynamically.

In real-time videoconferencing applications, the network communication channel bandwidth may vary greatly. Therefore, using all (or most) of the available bandwidth during a videoconferencing session is a priority so that the best possible quality can be delivered. Since the conditions of the network communication channel change dynamically during the real-time video conference, it would be beneficial to provide a videoconferencing system for efficiently utilizing the available network communication channel bandwidth while maintaining the presented video quality during a videoconference.

Video coders typically code video data according to a variety of data compression techniques to meet a target bit rate. Typically, this involves selection of coding parameters (e.g. quantization parameter, block/macroblock type selection(s), etc.) and application of coding techniques that induce data compression. The data compression techniques typically are lossy techniques, which incur data losses that cannot be recovered fully at decoding and playback. Accordingly, video coders typically operate according to coding "policies" that represent a balance between bit rate and recovered image quality throughout a coded video sequence. Accordingly, an encoder may be responsible for achieving a maximum recovered image quality given the bitrate restriction. When the network conditions stabilize, e.g. packets can be properly delivered to the receiver end with little or no loss or error, the encoder may usually choose the coding tools that maximize the coding efficiency. However, when network condition deteriorates, the encoder may start applying error resilience techniques, which can facilitate at the receiver end error recovery. For example, the known H.264 coding standard allows a video codec to code a frame as an intra-coded frame (I coding) at least once per 30 frames. Coding a frame by I coding techniques typically incurs higher bit rates than predictive coding techniques would have incurred by coding the frame according to predictive coding techniques. Forced mode selection, however, can be beneficial because it terminates accumulation of errors that might arise from long prediction chains in a video coding sequence and it also can contribute to error recovery if coded video data were lost due to transmission errors. In the event of a transmission error, decoding can resume when a decoder receives an intra coded frame.

The forced mode selection is an example of error resiliency built into the video coding protocol. Although a lower bit rate coding technique may be available to the video codec, the forced mode selection may generate a coded macroblock that has a higher bit rate than a macroblock coded by another mode selection with similar image quality. The forced mode selection, however, provides higher resiliency to error as noted. However, using error resiliency techniques, such as forced mode selection, during the coding of the bitstream may reduce the coding efficiency, depending upon the amount of error resiliency techniques used. In more detail, error resiliency features, such as forward error correction as well as redundant data and forced mode selection, when applied to a coded bitstream may decrease the coding efficiency because error resilience techniques usually introduces more data dependency during coding. The application of the error resiliency techniques usually can increase the probability of recovery from transmission errors (e.g. packet loss or error) at a receiver end. However, this improved ability to recover because of the applied error resiliency techniques may come at the cost of coding efficiency.

Coded video data may be transmitted from a video encoder to a video decoder in data packets. The packets include a packet header and a payload portion that carries the coded video data. The coded video data may have been processed by techniques to mitigate against data losses induced by transmission such as forward error correction, interleaving, etc. Many operating environments, such as packet-based communication networks, provide unpredictable channel bandwidth for communications. Prior to video delivery, it is possible for a transmitter to test network bandwidth and estimate a bit rate that a channel can support.

During operation, as video delivery is underway, a transmitting video codec may receive indications that channel impairments have arisen. For example, many packet-based networks engage in negative acknowledgement ("NACK") protocols. FIG. 1 illustrates the problem graphically. Channel bandwidth is shown as operating at three different levels over time: At CH $BW_{HI}$ prior to time t1, at CH $BW_{LOW}$ from time t1 to time t2 and at CH $W_{MED}$ after time t2. When the channel bandwidth drops from CH $BW_{HI}$ to CH $BW_{LOW}$ at time t1, the transmitter does not receive an express indication of the change but may receive NACK indications. In response to the NACKs, the transmitting video codec may revise its target bit rate to TR $BR_{LOW}$, a level at which it no longer receives NACKs.

A brute force approach to test for increased channel bandwidth might include an arbitrary increase of the target bit rate after a predetermined period of time elapses following stable operation. However, a transmitting video codec often has no way without potentially affecting the presentation quality of the decoded video to test the channel bandwidth to determine if the increased bandwidth is available. For example, it might happen that no increase in bandwidth has occurred (for example, the channel bandwidth may remain at CH $BW_{LOW}$), and an arbitrary increase in the transmitted bit rate may result in a loss of data and, by extension, an abrupt drop in image quality.

Therefore, there is a need for increasing the transmitted bit rate while providing an acceptable probability of recovering the transmitted data in view of an increased risk of transmission errors.

BRIEF DESCRIPTION OF THE DRAWINGS

FIG. 3B illustrates a sub-process of the method of FIG. 3A according to an embodiment of the present invention.

FIG. 7 illustrates another exemplary communication system in which the principles of the present invention may be performed.

DETAILED DESCRIPTION

Figure 1:
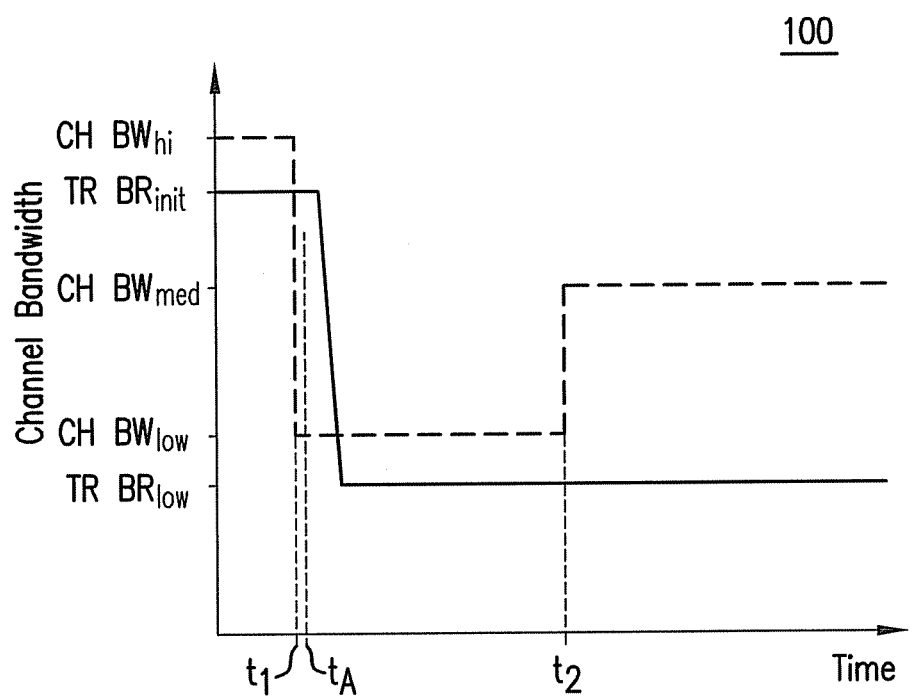
FIG. 1 illustrates a problem to be solved by embodiments of the present invention.

Embodiments of the present invention may provide a video coding system and method for increasing a transmitted output bit rate of a video encoding system by altering the content of the bit stream. A video encoder may receive a coding mode signal from a computer application for coding source video data, the coding mode signal indicating a target bit rate having a risk factor related to transmission error associated to the target bit rate. The coded bitstream may be modified based on the risk factor indicated in the coding mode signal. A modified coded bitstream may be outputted at the target bit rate and at a reduced coding efficiency, and the channel may be tested for transmission errors. Based on the test results, a revised coding mode signal indicating the same target bit rate, but a revised risk factor may be provided. The coded bitstream may be revised by removing the modifications previously made to the coded bitstream and a revised coded bitstream having greater coding efficiency may be output at the target bit rate.

Embodiments of the present invention may provide a video coding method and computer readable medium embodied with instructions for transmission environments with variable channel bandwidth. During a runtime mode of operation, source video data may be coded according to coding parameters selected based on a target bit rate. During a bandwidth change mode of operation, revised coding parameters may be selected based on an increased target bit rate and a risk factor, wherein the risk factor is derived from an analysis of the communication channel. The communication channel may be monitored for channel impairments in response to transmission of coded video coded according to the selected revised coding parameters. The revised coding parameters may indicate the application of additional error resiliency techniques. If the monitored channel impairments may be unacceptable, changing the target bitrate to a lower target bitrate and selecting new coding parameters based on the lower target bitrate. Meanwhile, if channel impairments are acceptable, the risk factor may be revised to allow selection of new coding parameters which may reduce the additional error resiliency techniques previously applied and may maintain the increased target bitrate. The bandwidth change mode may be exited, and the video data coded according to the selected new coding parameters may be transmitted.

Embodiments of the present invention may further provide an exemplary method for increasing a transmitted output bit rate of a video encoding system by altering the coding parameters. A video encoder may receive a coding mode signal from a computer application for coding source video data, the coding mode signal indicating the intention to increase bandwidth/target data rate. Exemplary coding parameters passed from application to the encoder may be a target bit rate, network statistics, and a risk of transmission error. The encoder will determine the error resiliency techniques to be applied to the source video data based on the parameters and the coding mode signal. Coded source video data by applying the determined error resiliency techniques, the parameters, and the coding mode signal, the coded source video data having a reduced coding efficiency. The coded source video data may be outputted at the target bit rate and at a reduced coding efficiency, and the channel may be monitored for transmission errors. Based on the results of the monitoring, the coded source video data may be modified by removing the applied error resiliency techniques while maintaining the target bitrate. The coded source video data may be output according to the modified coding parameters, the coded source video data having a greater coding efficiency based on the modified coding parameters.

Embodiments of the present invention may further provide a communication device that includes a camera, a communication network, and a computer application: The camera may capture real-time video data. The communication network may provide real time communications over a communication channel. The computer application may operate on a processor, which may be connected to the camera and the communication network. The processor may be configured to code captured real-time video data using initial coding parameters selected based an initial transmission bitrate and a risk factor derived from an analysis of the communication channel. The processor may increase the initial transmission bit rate to a target bitrate and revise the risk factor based on the increase of target bit rate and history of the communication channel. The processor may also select revised coding parameters based on the target bit rate and the revised risk factor for coding the captured real-time video data. Based on the selected revised coding parameters, the processor may apply error resiliency techniques commensurate with the risk factor and the target bit rate during coding of the video data. Based on a determination that channel impairments of the communication network are acceptable, the processor may modify the risk factor; and may select modified coding parameters based on the target bit rate and the modified risk factor. The target bit rate may remain constant and the modified risk factor may indicate a lower risk of channel impairments than the revised risk factor. Based on the selected revised coding parameters, the processor may remove the applied error resiliency techniques to satisfy the modified risk factor and may maintain the target bit rate during further coding of the video data. The processor may transmit the coded video data.

Computer applications that interact with the video codecs may collect transmission data, such as number of NACKs received, latency, packet loss information, confidence interval of the estimated parameters, an amount of time between receiving NACKs, an amount of time the codec has been in a specific mode, feed back from the receiver end and the like. The computer application may generate and maintain statistics based on the collected transmission data, for example, based on packet timestamps. In addition, the codec may also provide additional transmission data, such as indications of transmission errors, or the network may provide error information, or any other error detection scheme built into the application layer. The computer application may collect the transmission data, analyze the data, and determine the risk of an error occurring during transmission over the communication channel. Alternatively, in another embodiment, the computer application may pass the collected data to a codec for analysis.

A number of different networks, e.g., a cellular network, a wired or wireless computer network, such as the Internet or a LAN, an optical network, may be used either singularly, or in various combinations as the communication channel. When a plurality of different networks provide the communication channel, a central hub may be used to collect transmission data, which may include statistics, from the different networks according to the differing network protocols, the central hub may pass the collected data to the computer application/video codec for analysis of the transmission error data and determination of a risk of transmission error. There can also be a standalone software module that may analyze the channel impairment data collected from the communication channel, and may directly pass the risk factor to either the computer application and/or the video codec based on the analysis.

Figure 2:
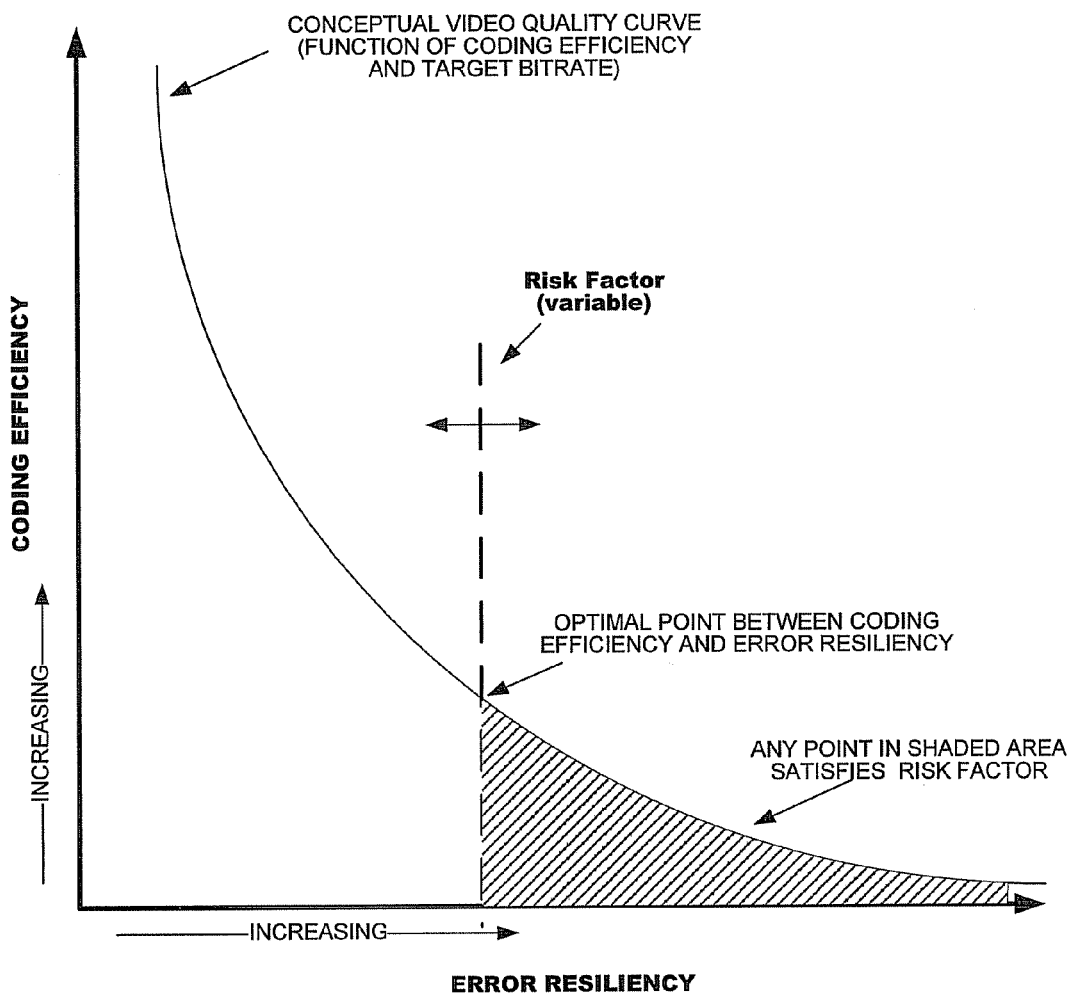
FIG. 2 illustrates graphically the concept of offsetting the risk of higher targeted bit rates versus the trade off between coding efficiency and applied error resiliency features according to an embodiment of the present invention.

FIG. 2 presents a graphical representation of a conceptual representation of coding efficiency relative to error resiliency. The problem to be solved may analogous to an optimization problem in which the goal may be to maximize image quality, which directly relates to coding efficiency and target bitrate, under the constraint of a risk factor, which directly relates to error resiliency, by changing the encoding parameters. The combination of coding efficiency and error resiliency may be determined to be applied to meet a target bit rate with respect to a risk factor. A computer application may set the target bit rate. Referring to FIG. 2, in graph 200, the Y-axis may represent increasing coding efficiency of a bitstream, while the X-axis may represent the increasing application of error resiliency features to the bitstream. Video quality may, for example, be a function of the coding efficiency and the target bitrate. As can be seen by the conceptual video quality curve, coding efficiency may, but not necessarily so, decrease as error resiliency features are applied to the coded bitstream. The risk factor may be a function of historical transmission channel data/statistics related to the target bitrate, reliability of the transmission channel medium, or direct analysis of a present data transmission as well as network configuration, performance capabilities of the codec, such as processor speed, and/or other factors. The risk factor may indicate the optimal point at which the trade off between coding efficiency and an acceptable level of error resiliency is applied to the coded bitstream. The acceptable level of error resiliency illustrates an estimated point at which acceptable video quality may be obtained at the decoder based on the risk factor, i.e., an indication of the amount of risk of channel impairment. The shaded area may represent an area of codec performance that satisfies the risk factor. Any performance outside of the shaded area, for example, may not satisfy the risk factor and/or meet the target bit rate. The graph 200 of FIG. 2 and the above description is purposes of explanation, and the claimed system should not be limited by it.

Figure 3A:
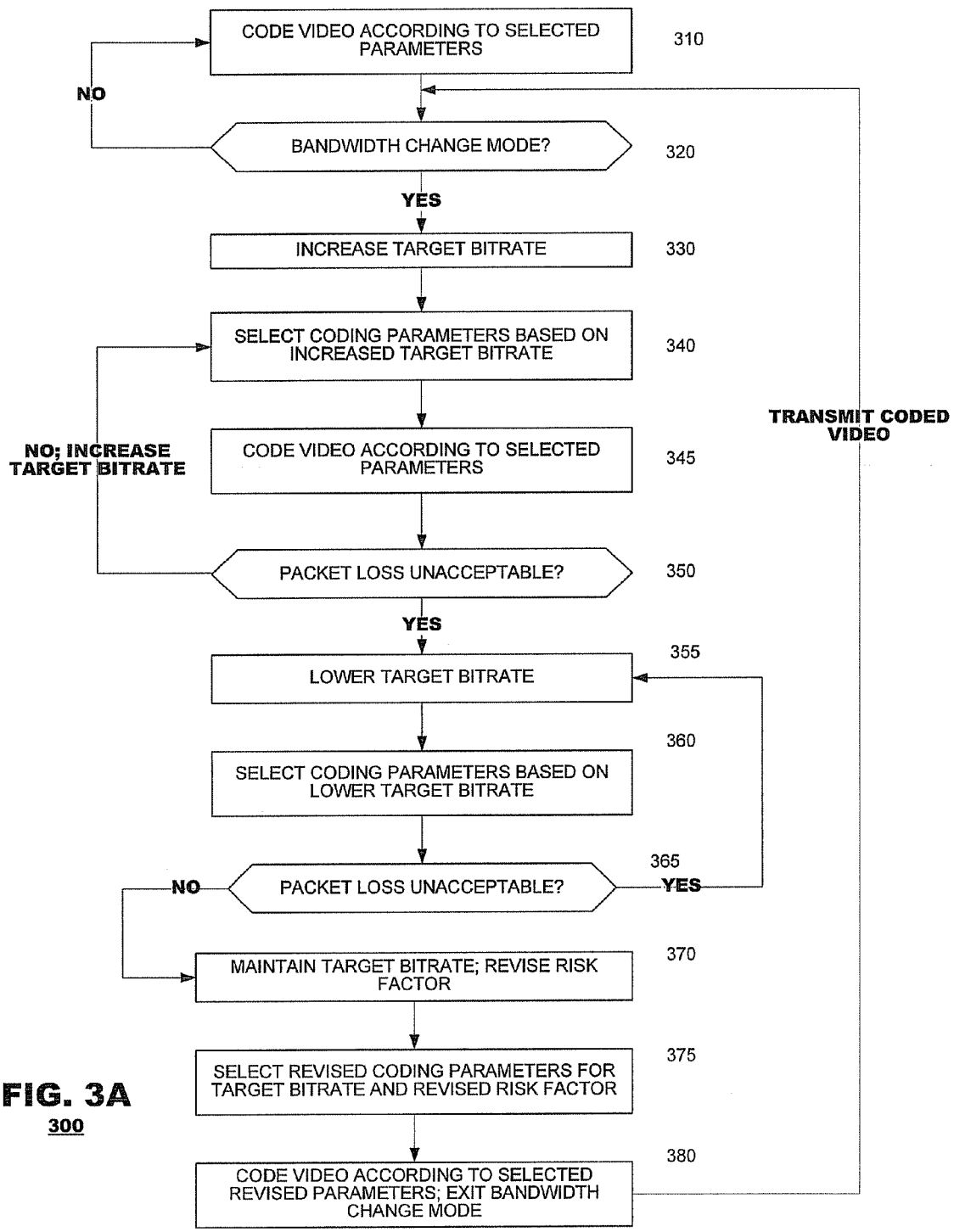
FIG. 3A illustrates a method for controlling a video coding system according to an embodiment of the present invention.

FIG. 3A illustrates a method for controlling a video coding system according to an embodiment of the present invention. The process 300 runs in two modes: a runtime mode and a bandwidth change mode. The runtime mode may be the mode chosen after the coding parameters have been selected and the system codes the source video data. The bandwidth change mode may have two phases: an increase bitrate phase and an increase coding efficiency phase. During the increase bitrate phase, the bitrate is increased to a target bitrate having a risk factor commensurate with the increased target bitrate. Coding parameters that result in more stringent error resiliency techniques being applied to the source video data during coding may be selected based on the target bitrate and the risk factor. While the increase coding efficiency phase is entered when the process determines that the communication channel conditions have stabilized. During increase coding efficiency phase, the coding efficiency may be increased by holding the target bitrate constant, but changing the risk factor to reflect to the more stable communication channel conditions. The coding efficiency may be increased by selecting coding parameters that apply less stringent error resiliency techniques during the coding of the source video data.

A system may begin coding after an initial test of channel bandwidth is performed by, for example, transmitting packets to a decoder at different transmission bit rates until channel impairment notifications are observed. Based on channel impairment notifications observed, an initial transmission bit rate may be set, and the process begins to operate in run-time mode. The testing may either be initiated by a computer application, which is controlling the codec, or a controller within the codec. Of course, other testing methods may be used to determine the initial transmission bit rate.

In an embodiment of the exemplary method, at step 310, a codec may code the source video using the selected coding parameters for target bit rate. At step 320, a codec controller may check to determine a mode change to the bandwidth change mode has indicated. The bandwidth change mode may be entered into when the system determines, for example, that the packet loss has been at an acceptable level for a predetermined period of time. If packet loss is acceptable, the system, which may be controlled by a computer application or a codec controller, may indicate that the output target bit rate should be increased. Alternatively, the codec controller may initiate the request to change to the bandwidth change mode after a preset time period.

If it is determined at step 320 that a bandwidth change mode was not requested, the method may return to step 310 at which the codec may continue to code the bitstream according to the present coding parameters. Alternatively, if a change to bandwidth change mode has been requested, the process 300 may proceed to step 330. At step 330, the codec controller may forward an increased target bit rate and a risk factor to the codec and/or controller. The increased target bit rate may, for example, be set to a bit rate slightly less than, such as 85 or 95%, of the estimated available channel bandwidth. Upon receipt of the target bit rate, at step 340, the codec may select coding parameters based the target bit rate and a risk factor associated with the target bitrate. The coding parameters may be selected from a look up table stored in a memory based on the risk factor and/or the target bit rate.

Once the coding parameters are selected, the source video is coded according to the selected parameters at step 345. The selected parameters will result in an increase in the target bit rate, which may include additional error resiliency techniques to be applied to the coded source data. As a result, coding efficiency may decrease. However, the source video coded using the selected parameters will likely have a higher probability of being decoded at an acceptable level of quality if transmission errors occur at the increased target bitrate. At step 350, it is determined whether the packet loss is unacceptable at the new, increased target bitrate. The determination of whether the packet loss is unacceptable may be based on analysis of a threshold for the number of packets lost, or other some other data or statistic provided by a receiver on a back channel. If the result of the inquiry, at step 350, is negative, in other words, packet loss is not unacceptable, the target bit rate may be increased further. In which case, steps 340, 345 and 350 are repeated. During this iterative process of steps 340, 345 and 350, the operating mode may remain the bandwidth change mode. Once the determination at step 350 is positive, in other words, yes, the packet loss is unacceptable, the target bitrate may be lowered.

The system may decide to fallback to the previous target bitrate, or it may determine to fall back to a lower bitrate between the previous target bitrate (at which packet loss was acceptable) and the latest target bitrate (at which packet loss was unacceptable). Based on the lower target bitrate, the codec or controller may select, at step 360, revised coding parameters, and begin coding the source video at the lower target bitrate. The revised coding parameters may include the application of error resiliency techniques commensurate with a risk factor associated with the lower target bitrate.

Again the packet loss is monitored at step 365, if it is determined to be unacceptable, the method returns to step 355. At step 355, the target bitrate is again lowered. Conversely, if the packet loss is acceptable at 365, the process continues to step 370. At step 370, since it has been indicated that the target bitrate is acceptable, the risk factor previously associated with the target bitrate may be revised to indicate a lower risk of transmission errors. The system selects, at step 375, revised coding parameters based on the target bitrate and the revised risk factor. The selected, revised risk factors may indicate a reduction in the application of error resiliency techniques that may result in increased coding efficiency because of the reduction in applied error resiliency techniques. Upon selection of the revised coding parameters, the source video is coded according the selected, revised risk factors at step 380. In addition, at step 380, an exit from the bandwidth change mode is indicated, and the system returns to runtime mode.

While in bandwidth detection mode, the selected coding parameters at step 340 may involve sub-processes. FIG. 3B illustrates a sub-process of the method of FIG. 3A according to an embodiment of the present invention. In the process 340A illustrated in FIG. 3B, the codec may be provided with the target bit rate, at 341, and the coding parameters may be selected based on a risk factor associated with the target bitrate. The coding parameters may be retrieved from a look up table in which the coding parameters, the target bitrate and risk factor are fields in the table. After the coding parameters are selected, at step 334, the coding parameters may be tested. The testing may be an estimate of the performance of the codec using an actual coding of a sample of the video data, or other known methods of determining expected codec performance with respect to the source video data expected to be coded and transmitted, or based on the estimation of current state/model of network condition, e.g. packet loss pattern, or based on re-encoding. The resulting test data may be analyzed by a controller or computer application. Alternatively, the testing of the selected coding parameters in step 334 may be based on an analysis of historical data (e.g., statistics) related to the rate of channel impairments that are received as coded video data is transmitted to a decoder. The rate may indicate the number of channel impairments over a period of time, where the period of time may, for example, be a pre-set amount of time, a period of time that varies based on the target bit rate, or based on a percentage (or magnitude) of increase of the target bit rate over the previous bit rate.

Based on the results of the testing, it may be determined at step 335 whether the risk factor and the target bit rate have been satisfied. The target bit rate and risk factor may be determined to be satisfied, when the resulting test data illustrates that the codec can code the source video data at the target bit rate and at an acceptable error rate given the conditions of the communication channel.

If the risk factor and the target bit rate have been satisfied, the method 340A proceeds to step 338. At step 338, the source video data may be coded using the coding parameters that satisfy the risk factor and the target data rate. After which, at step 339, the codec may code the source video data according to the selected coding parameters and may transmit the coded packets. A next frame may then be retrieved for coding, or, if no frames remain for coding, the method 340A may end.

Alternatively, if at step 335, it is determined risk factor and the target bit rate are not satisfied, the method 340A may proceed to step 336. At step 336, it may be determined whether the codec is capable based on present settings or hardware limitations of meeting the risk factor and target bit rate. The present settings may be, for example, a time limit threshold that does not allow the codec to perform a number of iterations to determine whether the codec may ever meet the target bit rate and risk factor, or a limit on the error resiliency features that may be applied to the source video. Alternatively, or in addition, the codec may be limited by hardware constraints, such as processor speed, from meeting the risk factor and target bit rate. If it is determined that the codec is capable meeting the risk factor and the targeted bit rate, the method proceeds back to step 331. At step 331, different coding parameters may be selected at 333, and the method 300 goes through another iteration of testing (334) and determining (335). After a number of iterations, the method 340A may return to step 336 where it is determined that the codec may not satisfy the risk factor and target bit rate.

Whenever it is determined that the codec cannot satisfy the risk factor and target bit rate at step 336, the process 340A proceeds to step 337. At step 337, the source video may be coded according to the present coding parameters.

The process 340A proceeds to step 339 at which the system transmits the coded packets coded according to the present coding parameters. The coded packets may be transmitted to a wired, wireless, optical communication channel, or a combination of the communication channels. A next frame may then be retrieved for coding, or, if no frames remain for coding, the method 300 may end.

Additionally, certain computer applications may have a range of target bit rates that allow the computer application to provide acceptable performance. For example, the target bit rate may be selected from one of a plurality of predetermined bit rates, e.g., any of a number of bit rates within the range of 128-384 Kbits/s (for video conferencing) or 8 to 15 Mbit/s (for HDTV), or may be a bit rate selected based on a risk factor associated with channel impairment, such as packet loss. For example, in a video conferencing embodiment, if the percentage of packet loss is 5%, and the initial bit rate was selected as 256 Kbits/s, the target bit rate may drop to 128 Kbits/s, while if the packet loss is 4%, the bit rate may drop from 256 Kbits/s to 200 Kbits/s. Alternatively, the target bit rate may increase as the percentage of packet loss decreases. For example, in a video conferencing application, the target bit rate may increase from 200 Kbits/s to 256 Kbits/s, when the packet loss is 0.01%.

Figure 4:
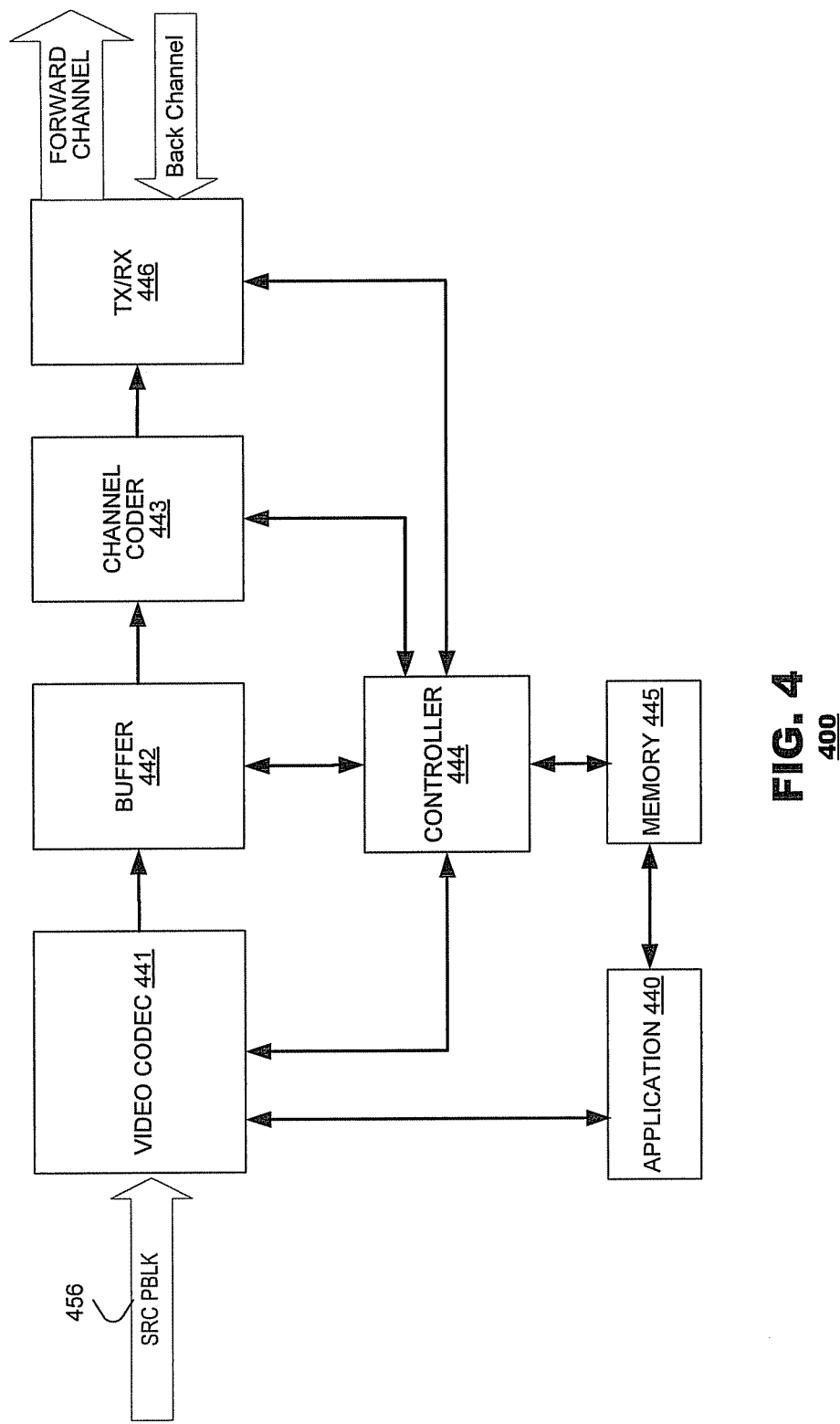
FIG. 4 illustrates a block diagram of a video coding system according to an embodiment of the present invention.

FIG. 4 illustrates a video coding system 400 according to an embodiment of the present invention. The exemplary video coding system 400 may include a video codec 441, a buffer 442, a channel codec 443, a controller 444, a memory 445, and a transmitter/receiver (TX/RX) 446. The video coding system may receive source video 456 from a computer application 440, or other external source such as a camera or storage device.

The video codec 441 may code source video data 456 as coded video. The video codec 441 may receive parameters from the computer application 440. Based on the parameters, e.g. target bitrate and risk factor the codec 441 may select coding parameters which are used to code the source video. The coding parameters may include parameters indicating error resiliency techniques to be apply during coding. The coding parameters may identify to the codec 441, the error resiliency tools that are to be used to apply particular error resiliency techniques during coding.

The buffer 442 may store coded video data for further processing. The channel coder 443 may further code the coded video, including applying error resiliency features, for transmission over a channel (applying, for example, forward error correction codes, interleaving and the like). The TX/RX 446 may transmit channel-coded data across a forward channel of the communication path, and may receive indications of channel impairments (for example, NACKs) via a back channel of the communication path. Any received channel impairment indicators included in the transmission data may be forwarded to the controller 444 and/or computer application 440 for analysis and tracking. The received channel impairment indicators may be forwarded to the controller 444, to the computer application 440, or both.

The controller 444 may control operation of the system 400 in response to channel impairment indications. For example, the controller 444 may reconfigure operation of the channel coder 443 dynamically in response to channel impairment indicators from the channel. Alternatively, the controller 444 may reconfigure delivery of coded video data from the buffer 442 in response to channel impairment indicators from the channel. Controller 444 may also be part of the computer application 440.

In an embodiment, the computer application 440 may be a video streaming, a video conferencing application, or a video delivery application hosted by a web service. The computer application 440 may communicate with the controller 444. For example, the computer application 440 may indicate, via messages, to the controller 444, a bit rate that the computer application 440 is going to transmit data. The messages may also include, for example, channel reliability data, codec performance, channel impairment data, coding parameters and encoder and/or decoder status and settings, confidence interval of parameter estimation, and transmission error risk. The transmission error risk may be a risk factor associated with the bit rate at which the computer application 440 will transmit data.

The channel reliability data may be based on a sampling period of the computer application 440 in which the computer application 440 receives data from the TX/RX 446. The sampling period may be, for example, milliseconds, seconds, the number of transmitted frames or minutes. The channel reliability data may be representative of the availability of the channel within a particular time period, which may be based on historical data maintained by the computer application 440. The confidence interval of parameter estimation may be a range of confidence that the risk factor has been correctly determined for the target bit rate given the conditions of the communication channel. The codec performance may include, for example, the codec's ability to maintain the target bit rate.

In an embodiment, the risk factor may be based on historical data related to, for example, a number of transmission errors that have occurred in the past when a particular target bit rate was selected by the computer application 440. The risk factor may be stored in a table, and may indicate a risk factor assigned to a particular transmission bit rate. The risk factor may be, for example, a number 1-10, or percentage, may represent the probability that channel impairment will result if the source video data is transmitted over the channel at the particular bit rate. The table may also include coding parameters selected types of error resiliency features, individually, in various combinations, or perhaps none, that may be applied to the coded bitstream based upon the particular bit rate. Each risk factor and bit rate may have a plurality of variations of error resiliency techniques that are to be applied. For example, if the computer application is a video conferencing application, the selected bit rate may be 384 Kbits/s and the risk indicator may be (6 or) 60%, to which may be assigned in the table a combination of error resiliency features, such as forward error correction, intra macroblock refresh, intra frame refresh, redundant slices and long term reference frames. Alternatively, the table may also have assigned to the (6 or) 60% risk indicator and the selected bit rate, the combination of multiple descriptive coding and redundant coded data. In the case of multiple combinations or choices of error resiliency features to apply, the codec may rely on additional information, for example, codec capabilities or type of network used to provide communication channel, from the computer application to select, or may simply select in the order the parameters are listed in the table. The additional information may also include, for example, the type of data being transmitted, desired decoded video quality, device power restrictions, processor restrictions, and other information that may be usable by the codec and controller to set coding parameters. The desired decoded video quality may be represented by a quantitative value as commonly known in the art. Additionally, instead of applying a combination of error resiliency features, a single error resiliency technique, or none at all, may be applied to the coded data based on the risk indicator. The table should not be limited to the foregoing examples, but may incorporate any number of error resiliency features or additional information. The table may also be based on, for example, the type of computer application, the selected bit rate, the transmission channel medium (e.g., wired (e.g., HDMI cable or coaxial), wireless (e.g., cellular) or fiber optic), in which case, the error resiliency techniques that are to be applied may vary and be applied in a variety of differing combinations, or not applied at all.

The controller 444 may access memory 445, and may use information provided in messages sent by the computer application 440 to retrieve, for example, from the table, coding parameters including error resiliency features to be applied during source video coding.

Figure 5:
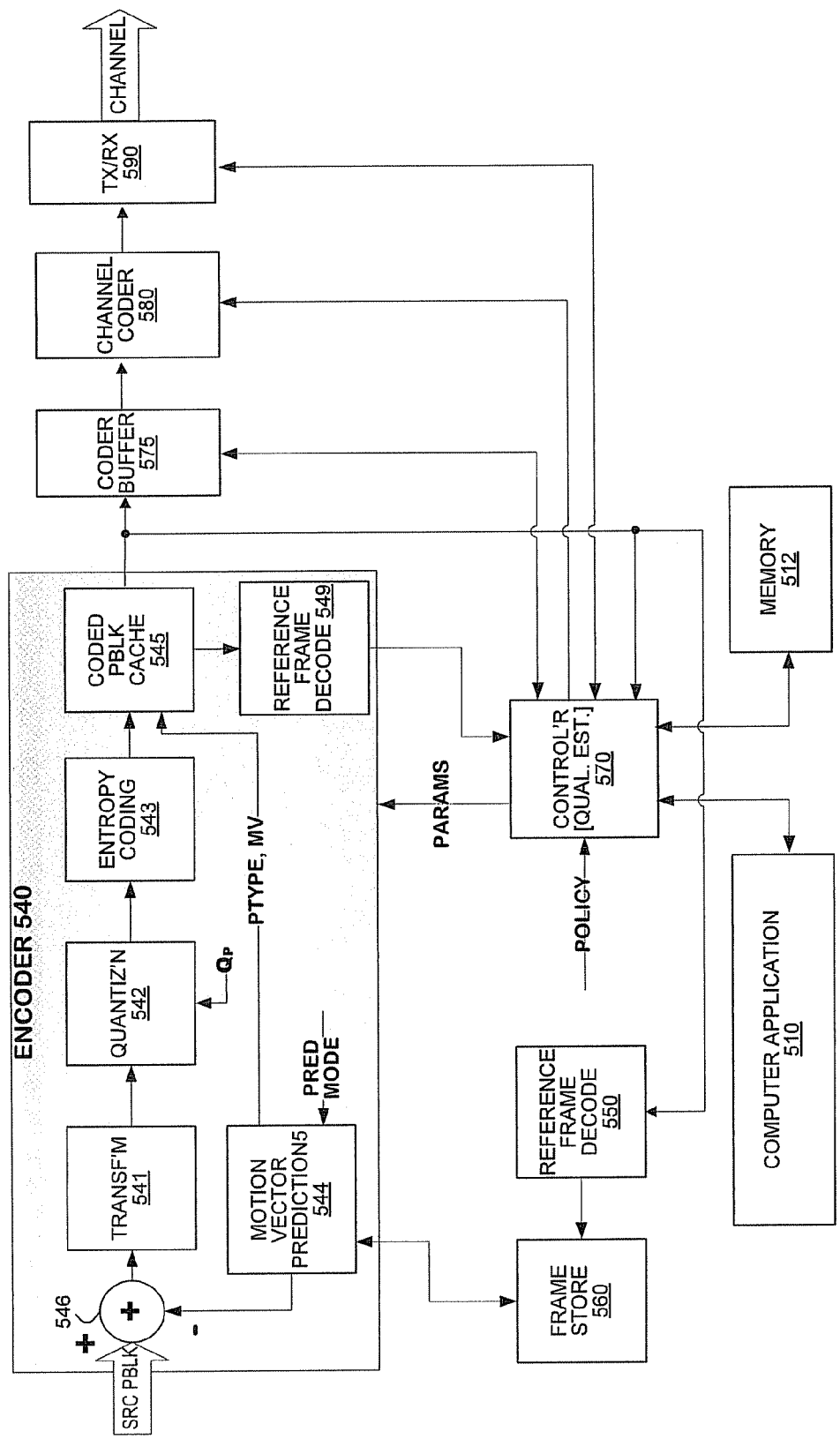
FIG. 5 illustrates an exemplary encoder for implementing an embodiment of the present invention.

FIG. 5 is an exemplary system 500 for implementing the above described method. An exemplary system 500 may include a pixel block encoder 540, a reference frame decoder store 550, a frame store 560, a controller 570, a codec buffer, 575, a channel coder 580 and a transmitter/receiver (TX/RX) 590. A computer application 510 may provide channel data including channel impairment data and statistics related to the channel impairments and codec throughput to the controller 570. The computer application 510 may analyze the channel impairment data and statistics, and may maintain and update the statistics. A memory 512 may store the channel impairment data, or a risk factor associated with the channel impairment data, and statistics, for example, in a lookup table, and may be accessed by the controller 570, the computer application 510 or both. The memory 512 may be part of the encoder 540 and be accessible by the controller 570. Alternatively, memory 512 may be accessible by the computer application 510.

The communication between the computer application and controller 570 may be via messages similar to those described with reference to FIG. 2 that allows the controller 570 and computer application 510 to exchange information. The computer application 510 may access a table in memory 512 to retrieve coding parameters based any one of or all of the encoder performance, channel impairment data, transmission error risk factor, and encoder and/or decoder status and settings, and the like. The transmission error risk factor for a specific target bit rate may be calculated by the computer application 510 using historical channel impairment data, or may be previously associated with the target bit rate.

The controller 570 may use the channel data received from the computer application 510 to determine the coding parameters that may be provided to the pixel block encoder 540, the channel coder 580, and other components that may use the coding parameters. Alternatively, the controller 570 may access a lookup table in the memory 512 to receive coding parameters based on messages from the computer application 510. The message may include the target bit rate and the transmission error risk factor. The controller 570 may control codec throughput estimation according to channel impairment data. Controller 570 may control selection of coding parameters to govern operation of the pixel block encoder 540 based on messages received from the computer application 510. Further, it may receive channel impairment indicators from the TX/RX 590, which the controller 570 may provide to the computer application 510. Based on the messages received from the computer application 510, the controller 570 may configure selection of any error resiliency features that are to be applied to the coded video as described above by selecting appropriate coding parameters. Alternatively, computer application 510 may provide the coding parameters to the controller 570.

The pixel block encoder 540 may code source pixel blocks input to the encoder into coded pixel blocks according to the parameters received from the controller 570. The pixel block encoder 540 may include a transform unit 541, a quantizer unit 542, an entropy coder 543, a motion vector prediction unit 544, a coded pixel block cache 545, and a subtractor 546. The transform unit 541 may convert input pixel block data into an array of transform coefficients, for example, by a discrete cosine transform (DCT) process or a wavelet process. The transform process used by the transform unit 541 may be determined according to the coding parameters provided by the controller 570. The quantizer unit 542 may truncate transform coefficients based on a quantization parameter $Q_p$, which also may be provided by the controller 570. The entropy coder 543 may code the resulting truncated transform coefficients by run-value, run-length or similar entropy coding techniques. The motion vector prediction unit 544 may retrieve pixel blocks from the frame store 560 according to motion vectors ("mv"). The cache 545 may store the coded pixel blocks. The subtractor 546 may compare motion vectors supplied by the motion vector prediction unit 544 to the pixel blocks of the source video.

Any of the transform unit 541, the quantizer unit 542, the entropy encoder 543, and/or the motion vector prediction unit 544 may contribute to the application of the error resiliency features that are to be applied to the coded video based on parameters received from the controller 570.

The reference frame decoder 549 may decode coded video data of each reference frame to provide data to the controller 570. The reference frame decoder 550 may decode coded video data of each reference frame to obtain a copy of the reference frame as it would be generated by a decoder (not shown).

The frame store 560 may store decoded reference frames. The codec buffer 575 may store coded video data for delivery to the channel coder 580. Retrieving data for channel coding, the channel coder 580 may apply channel coding techniques to the coded video data for transmission, including FEC coding and interleaving, to the channel based on coding parameters received from the controller 570. The channel coder 580 may provide the channel coded data to the TX/RX 590. The TX/RX 590 may transmit coded channel data from the channel coder to the channel. The TX/RX 590 also may receive channel impairment indicators from the back channel. The TX/RX 590 may deliver the data received over the backchannel to the controller 570.

The disclosed system may apply a number of different error resiliency features to the coded data using a number of techniques. Examples of the different error resiliency techniques that may be applied to address risk factors in the exemplary embodiments will now be described in more detail.

A first example is an error resiliency technique of switching among forward error correction (FEC) modes that may be applied at the codec or at a transmission layer by the channel coder 580. The channel coder 580 may operate according to several alternative coding modes, each of which generate different levels of output codes in response to a common input. The coding mode may be selected based on parameters indicated by the computer application 510 and the controller 570. For example, the channel coder 580 may employ:
- a K=9, Rate ¼ convolutional encoder, which generates four output code symbols for each input information bit,
- a K=9, Rate ⅓ convolutional encoder, which generates three output code symbols for each input information bit, or
- a K=9, Rate ½ convolutional encoder, which generates two output code symbols for each input information bit.

In an embodiment, a channel coder 580 may use a rate ½ convolutional encoder to provide a base level of error resiliency features, but may switch modes to the rate ⅓ convolutional encoder or rate ¼ convolutional encoder when providing additional error resiliency features due to a signal to increase the target bit rate.

The codec 540 may also perform a number of techniques to provide error resiliency features. For example, the transmission of redundant coded data (slice, segments, frame or macroblock) may be provided by the codec 540. In an embodiment, to apply additional error resiliency features, the controller 570 may cause coded video data stored in the codec buffer 575 to be read from the buffer more than once, coded independently and transmitted to the decoder.

Another codec 540 applied error resiliency technique may involve scalable video coding, which is a coding technique that uses different spatial and temporal layers of coding in both the base layers of video and audio data as well as enhancement layers.

Using the base layer, the source video data may be recovered at a first level of image quality. The "enhancement layer" data may be decoded in conjunction with the base layer data to recover source video data at a higher level of image quality than may be achieved when decoding the base layer data alone. When additional error resiliency features may be applied, the transmitter may send multiple base layers of coded data including additional error correction codes (i.e., FEC codes) in place of a number of enhancement layers. Alternatively, additional redundant enhancement layers may be applied as the additional error resiliency features.

Alternatively, the controller 570 may indicate a change to the codec 540 mode. In an embodiment, forced selection of intra-macroblocks may be indicated as the error resiliency feature to be applied to the coded data. For example, the controller 570 may select pixel blocks to be coded as I blocks at a rate higher than required by the present encoder coding policy. For example, where H.264 allows that macroblocks be coded as I blocks at once per 30 frames, the controller 570 may cause the macroblocks to be coded as I blocks once per 15 frames or once per 10 frames when performing probe operations. Such operations are considered to be within the spirit and scope of the present invention. This is also an example of reducing coding efficiency even though the transmitted bit rate may be increased.

Alternatively, multiple descriptive coding techniques, in which, for example, two sets of motion vectors are provided, may be used. In an embodiment, the controller 570 may select pixel blocks to be coded twice using predictive techniques referenced to two separate sets of reference frames. In this case, the coded video data may include two sets of motion vectors and possibly two sets of coded residuals, thereby, applying error resiliency features that may increase the transmitted bit rate, but may reduce the coding efficiency.

Long term reference frames may be used to provide another error resiliency feature that may allow a decoder to recover from channel impairments, but also reduces coding efficiency. In an embodiment, the controller 570 may code a pixel block using predictive techniques referenced to long term reference frames that may have been coded before the probe operation was attempted. The long term reference frame may be more likely to be properly decoded by a decoder than reference frames that were coded during a probe attempt.

In another embodiment, an error resilience technique that uses subsequences of coded data may be applied to the coded data during the increased channel bit rate probe operation. Using this technique, the encoder 540 may code a pixel block with a group of pixel blocks, all of which may be assigned to one of a plurality of sub-channels to be transmitted to a decoder. The pixel blocks in the group of pixel blocks may be encoded according to predictive coding techniques such that predicted pixel blocks such as P and B pixel blocks (frames or macroblocks or slices) only refer to the pixel blocks within the same sub-channel. Thus, if transmission errors may occur with respect to one sub-channel, decoding may occur for other sub-channels allowing for the transmission error to be corrected.

In yet another embodiment, data may be embedded into the coded video to provide the applied error resiliency; the encoder 540 may code a pixel block by embedding data (in, for example, a similar manner as a digital watermark) related to a previous frame in the pixel block. A decoder may retrieve the embedded data, if needed; otherwise, the pixel block data may be decoded without any adverse visual effects due to the embedded data. The coding efficiency may not increase because no new source video data is being added to the data used to fill the increased bit rate.

A number of different methods of compensating for lost data packets are known. Any one or more, or combination thereof, may be applied to provide the additional resiliency features when the bit rate is increased and the additional error resiliency features are added to the data packets. Not only one type of error resiliency feature may be applied, but combinations of the preceding error resiliency features or others may be applied as the additional error resiliency features. The above described error resiliency techniques may reduce coding efficiency, and the application of specific combinations of the above may have a greater effect on coding efficiency than another combination. However, due to the risk associated with a particular target bit rate, specific combinations of error resiliency techniques that affect coding efficiency may be applied to the coded video so that the target image quality may be maintained.

The foregoing list of error resiliency techniques is merely a sample of known error resiliency techniques that may be applied to the coded video data. The list is not intended to be an exhaustive list. Accordingly, other error resiliency techniques may be applied to the coded video data either singularly, or in combination with any one or more of the above.

Figure 6:
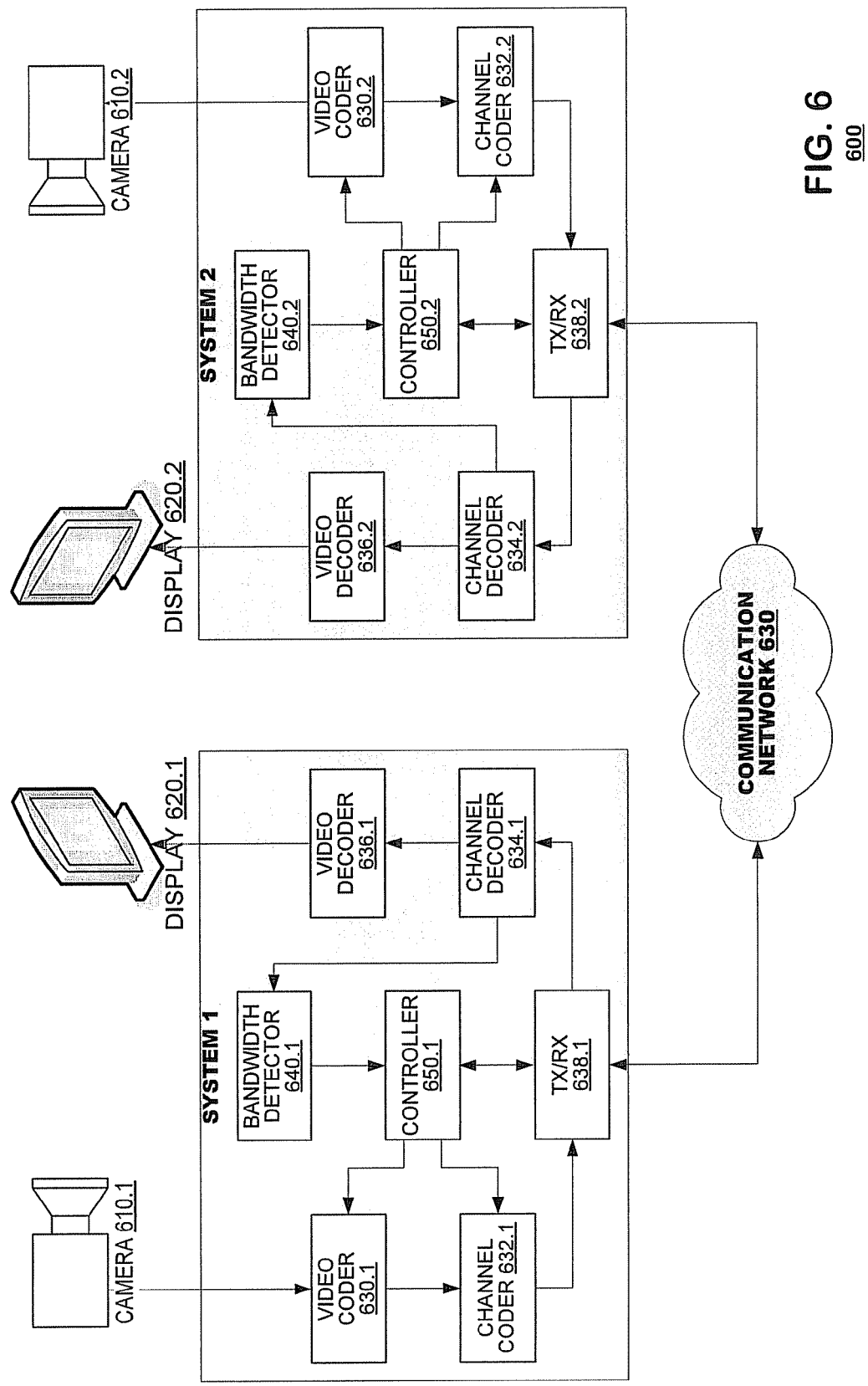
FIG. 6 illustrates an exemplary communication system in which the principles of the present invention may be performed.

FIG. 6 illustrates a communication system in which the principles of the disclosed embodiments may be performed. The system 600 may include two bi-directional video systems (systems 1 and 2). The systems 1 and 2 may, respectively, include a camera 610.1, 610.2 a display 620.1, 620.2; a video coder 630.1, 630.2; a video decoder 636.1, 636.2; a channel coder 632.1, 632.2; a channel coder 632.1, 632.2; a transmitter/receiver (TX/RX) 638.1, 638.2; a channel decoder 634.1, 634.2; a controller 650.1, 650.2; bandwidth detector 640.1, 640.2; a video decoder 636.1, 636.2; and a communication network 630.

The cameras 610.1, 610.2 may be used to capture source video at each respective location, and the displays 620.1, 620.2 at each respective location may render decoded video that may have been captured at the distant location. Each of the video coding systems (systems 1 and 2), may use the video coder 630.1, 630.2 to code source video from a local camera to a coded video stream. Each video decoder 636.1, 636.2 may perform operations to exploit spatial and temporal redundancies in coded video and thereby reduce its bit rate. The channel coder 632.1, 632.2 may process the coded video data from the video coder 630.1 for transmission via a channel. Each TX/RX 638.1, 638.2 may transmit encoded data to a communication network 630, and may receive data including encoded data from the communication network 630. The channel decoder 634.1, 634.2 may decode encoded channel data (e.g., channel impairment data, error resiliency data, etc.) received from a respective TX/RX 638.1, 638.2. The controller 650.1, 650.2 may control the coding decisions of the respective video coders 630.1, 630.1 and channel coders 632.1, 632.2 based on information received from its respective bandwidth detector 640.1, 640.2. Each of the respective controllers 650.1, 650.2 may be controlled by a computer application (not shown) that may communicate with the controllers 650.1, 650.2 via messages. The messages indicating coding parameters based on information exchanged with controller, such as, for example, target bit rate and risk factors. Of course, the messages may include additional information, such as system status including power levels, peripheral device connections and the like. Each bandwidth detector 640.1, 640.2 may derive communication network 630 bandwidth indicators from data received from the channel decoder 634.1, 634.2. The video decoder 636.1, 636.2 may decode the encoded video data with reference to the decoded channel data, and may deliver the decoded data to the display 620.1, 620.2. The communication network 630 may be a wired or wireless connection to a LAN, WAN, MAN, the Internet or similar type of communication medium.

FIG. 7 illustrates another communication system in which the principles of the present invention may be performed. The operation of the system 700 substantially matches the operation of FIG. 2 and FIG. 5 except that it is suitable for unidirectional transmission (e.g., media streaming). The system 700 includes a server 710, clients 720, and a communication network 330, such as the Internet, an intranet, or other suitable communication network. The server 710 and clients 720 may have processors and may have access to data storage (e.g., hard disks and RAID storage devices), and be coupled to the communication network 730. The server 710 may provide streaming media to each of the clients 720.

As shown, the server 710 may include a bandwidth detector 711, a controller 713, a channel coder 719, a video codec 716, a camera 715, a video storage 712, and a transmitter/receiver 717. The communication network 730 provides the channel and backchannel for communication between the server 710 and the clients 720. The communication network 730 may provide the streaming media and data, such as channel impairment indicators and data requests, to and from, respectively, the clients 720. The clients 720 may include a transmitter/receiver 721, a channel decoder 723, and a video decoder 725 operating on a processor (not shown), a display 727, and data storage (not shown).

As discussed above, the foregoing embodiments provide a coding/decoding system that performs multiple coding passes among source video data to generate recovered video data with reduced coding artifacts. The techniques described above find application in both software-based and hardware-based coders. In a software-based codec, the functional units may be implemented on a computer system (commonly, a server, personal computer or mobile computing platform) executing program instructions corresponding to the functional blocks and methods described in the foregoing figures. The program instructions themselves may be stored in a storage device, such as an electrical, optical or magnetic storage medium, and executed by a processor of the computer system. In a hardware-based codec, the functional blocks illustrated in FIG. 2 may be provided in dedicated functional units of processing hardware, for example, digital signal processors, application specific integrated circuits, field programmable logic arrays and the like. The processing hardware may include state machines that perform the methods described in the foregoing discussion. The principles of the present invention also find application in hybrid systems of mixed hardware and software designs.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method for transmission environments with variable channel bandwidth of a communication channel, comprising:
   during a runtime mode of operation, coding first source video data according to coding parameters selected based on a target bit rate,
   during a bandwidth change mode of operation:
      selecting revised coding parameters based on an increased target bit rate and a risk factor, wherein the risk factor is derived from an analysis of the communication channel, wherein the revised coding parameters indicate the application of additional error resiliency techniques;
      coding second source video data based on the selected revised coding parameters, wherein the second source video data has the increased target bit rate and the additional error resiliency;
      transmitting the coded second source video data on the communication channel;
      monitoring the communication channel for channel impairments in response to transmission of the coded second source video data;
      if channel impairments are unacceptable, changing the increased target bitrate to a lower target bitrate and selecting new coding parameters based on the lower target bitrate;
      if channel impairments are acceptable, revising the risk factor to allow selection of new coding parameters which reduce the additional error resiliency techniques previously applied while maintaining the increased target bitrate; and
      exiting the bandwidth change mode, while transmitting the video data coded according to the selected new coding parameters.

2. The video coding method of claim 1, the bandwidth detection mode of operation, further comprises:
   if, after the monitoring step, channel impairments are acceptable, increasing the previously increased target bitrate to a new increased target bitrate; and
   selecting another set of coding parameters based on the new increased target bitrate and a risk factor associated with the new increased target bitrate.

3. The video coding method of claim 1, further comprising: accessing a look up table including coding parameters associated with the increased target bit rate and the risk factor.

4. The video coding method of claim 3, further comprises: updating the look up table based on channel impairment data and statistics.

5. The video coding method of claim 1, wherein during the bandwidth change mode of operation, the selecting revised coding parameters further comprises:
   accessing a look up table maintained by a computer application, wherein the look up table is updated based on channel impairment data and statistic obtained during the runtime mode of operation; and
   selecting revised coding parameters, by the computer application, from the look up table based the increased target bit rate and the risk factor.

6. The video coding method of claim 5, wherein the look up table includes a plurality of different error resiliency techniques to be applied to the source video data either singularly or in combination based upon the risk factor or the increased target bit rate.

7. The video coding method of claim 5, comprising:
   forwarding, by the computer application, the selected revised coding parameters to a video codec to perform the coding.

8. The video coding method of claim 1, wherein the error resiliency techniques applied are selected from at least one of forward error correction, redundant coded data, forced selection of intra-block modes, multiple motion vector, additional long term reference frames, and embedded data.

9. The method of claim 1, wherein the communication channel includes a cellular network, a computer network, a wireless communication network, a wired communication network, or any combination of networks.

10. A communication device, comprising:
    a camera for capturing real-time video data;
    a communication network for providing real time communications over a communication channel;
    a computer application operating on processor, connected to the camera and the communication network, the processor configured to:
       during a runtime mode of operation, coding source video data according to coding parameters selected based on a target bit rate,
       during a bandwidth change mode of operation:
          selecting revised coding parameters based on an increased target bit rate and a derived risk factor, wherein the derived risk factor is derived from an analysis of the communication channel, wherein the revised coding parameters indicate the application of additional error resiliency techniques;
          coding second source video data based on the selected revised coding parameters, wherein the second source video data has the increased target bit rate and the additional error resiliency;
          transmitting the coded second source video data on the communication channel;
          monitoring the communication channel for channel impairments in response to transmission of the coded second source video data;
          if channel impairments are unacceptable, changing the increased target bitrate to a lower target bitrate and selecting new coding parameters based on the lower target bitrate;

if channel impairments are acceptable, revising the risk factor to allow selection of new coding parameters which reduce the additional error resiliency techniques previously applied while maintaining the increased target bitrate; and exiting the bandwidth change mode, while transmitting the video data coded according to the selected new coding parameters.

11. The communication system of claim 10, wherein the target bit rate remains constant and the revised risk factor indicates a lower risk of channel impairments than the derived risk factor.

12. The communication system of claim 11, comprising: a video codec having an input for source video data and an output for coded video data;

and a memory for storing a look up table including coding parameters corresponding to a plurality of target bit rates and related risk factors.

13. A non-transitory computer-readable storage medium encoded with a computer-executable instructions for causing a computer to perform a method comprising:

during a runtime mode of operation, coding a sequence of source video data according to coding parameters selected based on a target bit rate, during a bandwidth change mode of operation:

selecting revised coding parameters based on an increased target bit rate and a risk factor, wherein the risk factor is derived from an analysis of the communication channel, wherein the revised coding parameters indicate the application of additional error resiliency techniques;

coding second source video data based on the selected revised coding parameters, wherein the second source video data has the increased target bit rate and the additional error resiliency;

transmitting the coded second source video data on the communication channel;

monitoring the communication channel for channel impairments in response to transmission of the coded second source video data;

if channel impairments are unacceptable, changing the increased target bitrate to a lower target bitrate and selecting new coding parameters based on the lower target bitrate;

if channel impairments are acceptable, revising the risk factor to allow selection of new coding parameters which reduce the additional error resiliency techniques previously applied while maintaining the increased target bitrate; and exiting the bandwidth change mode, while transmitting the video data coded according to the selected new coding parameters.

14. The computer-readable storage medium of claim 13, further comprising: analyzing the communication channel for channel impairments;

based on a determination that channel impairments are acceptable, signaling a mode change to a bandwidth detection mode of operation;

while in the bandwidth detection mode, revising the risk factor, while maintaining the increased target bit rate constant;

selecting coding parameters to satisfy the revised risk factor and the maintained increased target bit rate; returning to a runtime mode of operation; and coding a further sequence of source video according to the selected coding parameters based on the revised risk factor and the maintained constant target bit rate.

15. The computer-readable storage medium of claim 14, wherein during the bandwidth detection mode of operation, the selecting revised coding parameters further comprises: accessing a look up table including coding parameters associated with the increased target bit rate and the risk factor.

16. The computer-readable storage medium of claim 15, further comprises:

updating the look up table based on channel impairment data obtained during the runtime mode of operation.

17. A method for increasing a transmitted output bit rate of a video delivery system by altering the content of the delivered bit stream, comprising:

receiving a coding mode signal for coding source video data, the coding mode signal indicating a target bit rate, wherein the target bit rate is associated with a risk factor related to transmission errors of a communication channel of the video delivery system;

modifying the coded bitstream by applying error resiliency techniques according to the risk factor;

outputting the coded bitstream on a communication channel at the target bit rate and with the applied error resiliency techniques, wherein the coded bitstream has a reduced coding efficiency due to the modifications;

monitoring the communication channel for transmission errors;

based on the results of the monitoring, receiving a revised coding mode signal indicating the target bit rate and a revised risk factor;

revising the coded bitstream by removing the applied error resiliency techniques previously made to the coded bitstream; and outputting the coded bitstream on a communication channel at the target bit rate and, at an increased coding efficiency due to the removal of the applied error resiliency techniques.

18. The method of claim 17, further comprising: selecting revised coding parameters in response to coding mode signal;

prior to coding, testing the selected revised coding parameters to determine if the revised coding parameters satisfy the increased target rate and the risk factor; and if the increased target bit rate and the risk factor are satisfied, coding the source video data using the selected revised coding parameters.

19. A method for increasing a transmitted output bit rate of a video encoding system, comprising:

receiving a coding mode signal from a computer application for coding source video data, the coding mode signal indicating a target bit rate having a risk factor related to transmission error associated to the target bit rate, wherein the risk factor indicates application of additional error resiliency techniques;

modifying the coded bitstream based on the risk factor indicated in the coding mode signal, wherein said modifying comprises applying the additional error resiliency techniques;

outputting the modified coded bitstream at the target bit rate and at a reduced coding efficiency to a communication channel;

monitoring the communication channel for transmission errors;

based on the results of the monitoring, revising the coding mode signal output by the computer application, wherein the coding mode signal indicates the same target bit rate, but a revised risk factor;

revising the coded bitstream based on the revised coding mode signal, wherein said revising comprises removing the modifications previously made to the coded bitstream; and outputting a revised coded bitstream having greater coding efficiency at the target bit rate.

20. A method for increasing a transmitted output bit rate of a video encoding system by altering the coding parameters, comprising: receiving a coding mode signal from a computer application for coding source video data, the coding mode signal indicating the intention to increase target bit rate; passing coding parameters from the computer application to the encoder, wherein the coding parameters include an increased target bit rate, network statistics, and a risk of transmission error resulting at least in part from the increased target bit rate; determining, by the encoder, increased error resiliency techniques to be applied to the source video data based on the parameters and the coding mode signal, wherein the increased error resiliency techniques are based at least in part on the risk of transmission error; coding the source video data by applying the determined increased error resiliency techniques, the parameters, and the coding mode signal, the coded source video data having a reduced coding efficiency at least partly as a result of the increased error resiliency techniques; outputting coded source video data at the increased target bit rate and at the reduced coding efficiency to a communication channel; monitoring the communication channel for transmission errors; based on the results of the monitoring, modifying the coding parameters to remove the applied error resiliency techniques while maintaining the increased target bitrate; and outputting coded source video data according to the modified coding parameters, the coded source video data having a greater coding efficiency based on the modified coding parameters.

21. A video coding method for transmission environments with variable channel bandwidth of a communication channel, comprising:
transmitting on the communication channel, at a first bit rate, source video data coded according to first coding parameters selected based on the first bit rate;
after said transmitting source video data coded according to first coding parameters, transmitting on the communication channel, at a second bit rate that is greater than the first bit rate, source video data coded according to second coding parameters selected based on the second bit rate,
wherein the second coding parameters indicate greater error resiliency than the first coding parameters, wherein the greater error resiliency is sufficient to maintain a target image quality while transmitting the source video data at the second bit rate;
in response to said transmitting source video data coded according to the second coding parameters, monitoring the communication channel for channel impairments;
if channel impairments are unacceptable, transmitting on the communication channel, at a third bit rate that is lower than the second bit rate, source video data coded according to third coding parameters selected based on the third bit rate;
if channel impairments are acceptable, transmitting on the communication channel, at the second bit rate, source video data coded according to fourth coding parameters selected based on the second bit rate, wherein the fourth coding parameters indicate greater coding efficiency and less error resiliency than the second coding parameters.

22. The method of claim 21, wherein: the third bit rate is the same as the first bit rate; and the third coding parameters are the same as the first coding parameters.

23. The method of claim 21, further comprising: in response to said transmitting source video data coded according to first coding parameters, determining that channel impairments are acceptable;
wherein said transmitting source video data coded according to second coding parameters is in response to said determining.

24. The video coding method of claim 1, wherein deriving the risk factor from an analysis of the communication channel comprises: deriving the risk factor as a function of historical communication channel data related to the target bitrate.

25. The video coding method of claim 1, wherein deriving the risk factor from an analysis of the communication channel comprises: deriving the risk factor as a function of reliability of the communication channel medium.

26. The video coding method of claim 1, wherein deriving the risk factor from an analysis of the communication channel comprises: deriving the risk factor as a function of direct analysis of a transmission of the first source video data on the communication channel, and at least one of network configuration or performance capabilities of a codec, wherein the codec performs said coding first source video data.

27. The video coding method of claim 1, wherein the coding parameters include coding efficiency and error resiliency, and wherein the risk factor indicates an optimal relationship between coding efficiency and a specified level of error resiliency.

\* \* \* \* \*